9775X
H. L. Pierce,
Crimping Leather,
Patented June 25, 1836.
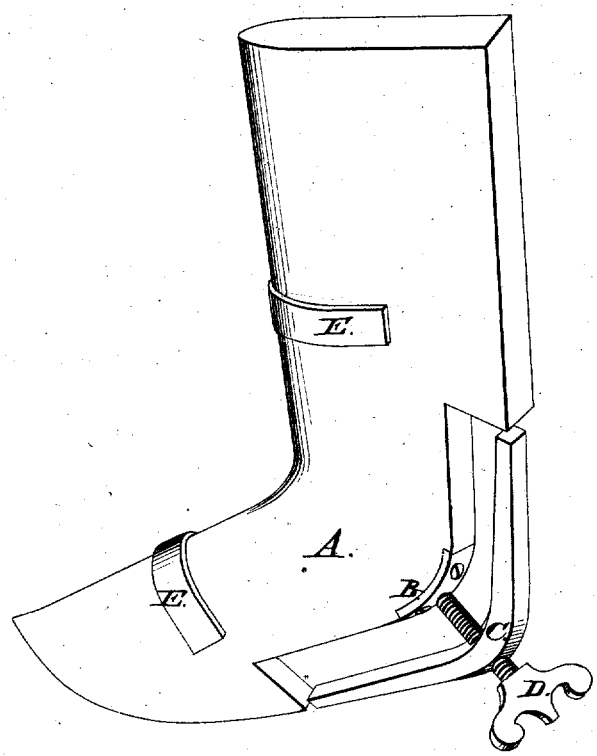
N. PETERS, PHOTO-LITHOGRAPHER, WASHINGTON, D. C.

9775X

June 25, 1836

Hubbard L. Pierce of St Johnsbury Vermont.

Letters Patent

The Schedule referred to in these Letters Patent and making part of the
same containing a description in the words of the said Hubbard
L. Pierce himself of his improvement in the Boot Crimp.

To all people to whom these presents shall come: Be it known
that I Hubbard L. Pierce of St Johnsbury in the County of Cal
edonia and State of Vermont have invented a new and useful im
provement in the Boot Crimp, and that the following is a full
description thereof. The crimp board is to be made of wood or me
talic substance and in front formed similarly to those in ordina
ry use, and of usual dimentions proportional to the size of the
work; from near the center of the foot let there be a cut an inch
and an half or more or less in depth extending semicircular
ly to a point upon the back part of the leg about equidistant
from the heel, thereby cutting off the heel as in boards in ordi
nary use and leaving instead thereof an arc of a circle in said
cut in the centre of the circumference of which arc is placed a bedded socket
of hard or metalic substance for the point of a screw hereinafter de
scribed to play upon as a fulcrum. Said Crimp has a moveable
heel of iron or other hard or metalic substance to rest upon said
arc of a circle and to do its office to play off therefrom by a
screw of metalic or hard substance to pass through the point of
the heel to the above named socket. Upon the point of said crimp
may be used three or more metalic springs to confine the leather
in crimping at suitable places. When the leather to be con
fined is suitably placed upon the board by means of said spring
catch it by drawing across said moveable heel and suitably at the
other parts to keep it in place and then by the power of said
screw with little labour the leather will be brought into suitable
shape and crimped as desired. Said improvements consisting in 9775 X June 25, 1836 and moveable screw heel and the said springs applied to to cramps in other respects of ordinary use and is to be known by the name of "the heel screw Boot Cramp" which improvements I claim as my own invention. A model and drawing accompanying this specification. In testimony that the above is a true specification of my said improvement as above described I have hereto set my hand the 29th day of April A. D. 1836

Witness
Charles Roberts
George C Cahoon

Hubbard L Price.

(drawing made by [illegible])  (462 words.

Drawing